United States Patent
Shin et al.

(10) Patent No.: US 8,675,342 B2
(45) Date of Patent: Mar. 18, 2014

(54) STACKED CHIP DEVICE AND MANUFACTURING METHOD THEREOF

(75) Inventors: Jong Beom Shin, Gyeongsangnam-do (KR); Hyun Woo Kim, Gyeonggi-do (KR); Doo Young Kim, Gyeonggi-do (KR); Hyung Kyu Shim, Busan (KR); Hyun Kyu Im, Busan (KR); Youn Sik Jin, Gyeonggi-do (KR); Dong Gun Kim, Busan (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 80 days.

(21) Appl. No.: 13/494,544

(22) Filed: Jun. 12, 2012

(65) Prior Publication Data

US 2012/0320496 A1 Dec. 20, 2012

(30) Foreign Application Priority Data

Jun. 16, 2011 (KR) .................. 10-2011-0058586

(51) Int. Cl.
*H01G 4/06* (2006.01)

(52) U.S. Cl.
USPC ............... 361/321.2; 361/321.1; 361/301.2; 361/301.4; 361/306.1; 361/306.3

(58) Field of Classification Search
USPC ............. 361/321.2, 321.1, 303–305, 301.2, 361/301.4, 311–313, 306.1, 306.3
See application file for complete search history.

(56) References Cited

U.S. PATENT DOCUMENTS

| | | | | |
|---|---|---|---|---|
| 6,445,594 | B1 * | 9/2002 | Nakagawa et al. | 361/776 |
| 6,501,164 | B1 * | 12/2002 | Chen et al. | 257/686 |
| 6,677,181 | B2 * | 1/2004 | Park et al. | 438/112 |
| 6,744,141 | B2 * | 6/2004 | Kimura | 257/777 |
| 6,984,885 | B1 * | 1/2006 | Harada et al. | 257/696 |
| 7,521,288 | B2 * | 4/2009 | Arai et al. | 438/109 |
| 7,943,470 | B2 * | 5/2011 | Uchiyama | 438/361 |
| 7,952,201 | B2 * | 5/2011 | Shibata et al. | 257/773 |
| 8,232,622 | B2 * | 7/2012 | Urakawa | 257/531 |

FOREIGN PATENT DOCUMENTS

KR 10-0578296 5/2006

* cited by examiner

*Primary Examiner* — Nguyen T Ha

(57) ABSTRACT

Disclosed herein are a stacked chip device including: a stacked body in which a plurality of sheets having an internal electrode made of a conductive material are stacked; external electrodes provided at both sides of the stacked body; and connection electrodes extending from the internal electrode and electrically connecting the internal electrode with the external electrodes, wherein the connection electrodes include: a plating solution permeation preventing section extending from the internal electrode, however, extending with a thickness smaller than the thickness of the internal electrode; and a contact reinforcement section extending from the plating solution permeation preventing section, however, extending in the form in which the thickness thereof is gradually extended toward the external electrode, and a manufacturing method thereof.

22 Claims, 2 Drawing Sheets

STACKED CHIP DEVICE AND MANUFACTURING METHOD THEREOF

CROSS REFERENCE(S) TO RELATED APPLICATIONS

This application claims the benefit under 35 U.S.C. Section 119 of Korean Patent Application Serial No. 10-20402011-0058586, entitled "Stacked Chip Device and Manufacturing Method Thereof" filed on Jun. 16, 2011, which is hereby incorporated by reference in its entirety into this application.

BACKGROUND OF THE INVENTION

1. Technical Field

The present invention relates to a stacked chip device and a manufacturing method thereof, and more particularly, to a stacked chip device and a manufacturing method thereof that can prevent a plating solution from permeating an internal electrode from the outside during a manufacturing process, improve durability against thermal shock, and increase contact efficiency between the internal electrode and an external electrode.

2. Description of the Related Art

With the trend of high speed and high frequency a semiconductor device which is a primary component in addition to miniaturization of electronic apparatuses such as a cellular phone, and the like, a super-high capacity multi-layer ceramic capacitor has been required. To this end, a capacitance to a size needs to increase, and as a result, a dielectric layer and an internal electrode layer need to be gradually thinner.

Hereinafter, a stacked chip device such as a multi-layer ceramic capacitor in the related art will be described below.

FIG. 1 is a cross-sectional view schematically showing a part of a stacked chip device in the related art.

FIG. 1 schematically shows a structure of one layer of one sheet in the stacked chip device in the related art, that is, a dielectric sheet such as a green sheet. Referring to FIG. 1, the stacked chip device 1 in the related art can be configured in the form of a stacked body in which a plurality of dielectric sheets 20 having an internal electrode 11 made of a conductive material are stacked and external electrodes 30 electrically connected with the internal electrode 11 are provided at both sides of the stacked body to serve as an external terminal for mounting the stacked chip device.

Herein, the internal electrode 11 is electrically connected with the external electrodes 30 through connection electrodes 12. That is, the connection electrodes 12 extend to the outside from the internal electrode 11 to contact the external electrodes 30, such that the internal electrode 11 and the external electrodes 30 can be electrically connected with each other.

In this case, the connection electrode 12 extends with a thickness b smaller than the thickness of the internal electrode 11. This is to prevent a plating solution from permeating the internal electrode 11 when the external electrodes 30 are formed at both sides of the stacked body through a plating method such as dipping.

That is, when the connection electrode 12 extends with a thickness which is the same as the thickness of the internal electrode 11 to be electrically connected with the external electrodes 30, contact efficiency between the connection electrode 12 and the external electrodes 30 is excellent, but the plating solution may permeate the internal electrode 11 through the connection electrode 12 during a forming process of the external electrodes 30.

In particular, the connection electrode 12 has the thickness b smaller than the thickness of the internal electrode 11 so that a vertical distance maintains a predetermined gap a from the center of a rounded edge of the dielectric sheet 20, and as a result, the plating solution can be prevented from permeating the connection electrode 12.

However, in this case, since the thickness of the connection electrode 12 is smaller than the thickness of the internal electrode 11, a contact area of the connection electrode 12 that contacts the external electrode 30 decreases, such that an electrical capacity of the stacked chip device deteriorates due to deterioration of the contact efficiency between the internal electrode 11 and the external electrode 30 and when capacitance deterioration is associated with other problems, even a capacity zero phenomenon occurs.

SUMMARY OF THE INVENTION

An object of the present invention is to provide a stacked chip device and a manufacturing method thereof that can prevent a plating solution from permeating an internal electrode from the outside during a manufacturing process and improve durability against thermal shock.

Further, another object of the present invention is to provide a stacked chip device and a manufacturing method thereof that can improve connection efficiency between an internal electrode and an external electrode of the stacked chip device.

According to an exemplary embodiment of the present invention, there is provided a stacked chip device including: a stacked body in which a plurality of sheets having an internal electrode made of a conductive material are stacked; external electrodes provided at both sides of the stacked body; and connection electrodes extending from the internal electrode and electrically connecting the internal electrode with the external electrodes, and the connection electrodes include: a plating solution permeation preventing section extending from the internal electrode, however, extending with a thickness smaller than the thickness of the internal electrode; and a contact reinforcement section extending from the plating solution permeation preventing section, however, extending in the form in which the thickness thereof is gradually extended toward the external electrode.

The sheet may be formed by a green sheet having rounded edges, and the contact reinforcement section may extend from a point spaced apart from the center of the edge of the sheet by the shortest distance in the connection electrode.

The plating solution permeation preventing section may extend to have the same thickness.

The thickness of the plating solution permeation preventing section may be 20 to 60% smaller than the thickness of the internal electrode and the thickness of the contact portion of the contact reinforcement section contacting the external electrode may be substantially 60 to 85% smaller than the thickness of the internal electrode.

In the case where the thickness of the internal electrode is in the range of 250 to 340 μm and an extension length of the plating solution permeation preventing section is in the range of 110 to 250 μm, the thickness of the contact portion of the contact reinforcement section contacting the external electrode may be in the range of 210 to 290 μm when the number of layers of the stacked sheets are less than 40 and the thickness of the contact portion of the contact reinforcement section contacting the external electrode may be in the range of 200 to 270 μm when the number of layers of the stacked sheets are equal to or more than 40.

In the case where the thickness of the internal electrode is in the range of 250 to 840 μm and the extension length of the plating solution permeation preventing section is in the range of 120 to 480 μm, the thickness of the contact portion of the contact reinforcement section contacting the external electrode may be in the range of 210 to 710 μm when the number of layers of the stacked sheets are less than 40 and the thickness of the contact portion of the contact reinforcement section contacting the external electrode may be in the range of 200 to 670 μm when the number of layers of the stacked sheets are equal to or more than 40.

In the case where the thickness of the internal electrode is in the range of 285 to 799 μm and the extension length of the plating solution permeation preventing section is in the range of 180 to 1030 μm, the thickness of the contact portion of the contact reinforcement section contacting the external electrode may be in the range of 240 to 680 μm when the number of layers of the stacked sheets are less than 40 and the thickness of the contact portion of the contact reinforcement section contacting the external electrode may be in the range of 230 to 640 μm when the number of layers of the stacked sheets are equal to or more than 40.

In the case where the thickness of the internal electrode is in the range of 800 to 1740 μm and the extension length of the plating solution permeation preventing section is in the range of 180 to 1030 μm, the thickness of the contact portion of the contact reinforcement section contacting the external electrode may be in the range of 680 to 1480 μm when the number of layers of the stacked sheets are less than 50 and the thickness of the contact portion of the contact reinforcement section contacting the external electrode may be in the range of 600 to 1300 μm when the number of layers of the stacked sheets are equal to or more than 50.

In the case where the thickness of the internal electrode is in the range of 1119 to 1740 μm and the extension length of the plating solution permeation preventing section is in the range of 210 to 1220 μm, the thickness of the contact portion of the contact reinforcement section contacting the external electrode may be in the range of 950 to 1480 μm when the number of layers of the stacked sheets are less than 50 and the thickness of the contact portion of the contact reinforcement section contacting the external electrode may be in the range of 840 to 1300 μm when the number of layers of the stacked sheets are equal to or more than 50.

In the case where the thickness of the internal electrode is in the range of 1200 to 1980 μm and the extension length of the plating solution permeation preventing section is in the range of 210 to 1220 μm, the thickness of the contact portion of the contact reinforcement section contacting the external electrode may be in the range of 900 to 1480 μm when the number of layers of the stacked sheets are less than 50 and the thickness of the contact portion of the contact reinforcement section contacting the external electrode may be in the range of 840 to 1380 μm when the number of layers of the stacked sheets are equal to or more than 50.

In the case where the thickness of the internal electrode is in the range of 1200 to 1599 μm and the extension length of the plating solution permeation preventing section is in the range of 140 to 1080 μm, the thickness of the contact portion of the contact reinforcement section contacting the external electrode may be in the range of 900 to 1200 μm when the number of layers of the stacked sheets are less than 50 and the thickness of the contact portion of the contact reinforcement section contacting the external electrode may be in the range of 840 to 1120 μm when the number of layers of the stacked sheets are equal to or more than 50.

In the case where the thickness of the internal electrode is in the range of 1600 to 1730 μm and the extension length of the plating solution permeation preventing section is in the range of 140 to 1080 μm, the thickness of the contact portion of the contact reinforcement section contacting the external electrode may be in the range of 1120 to 1200 μm when the number of layers of the stacked sheets are less than 50 and the thickness of the contact portion of the contact reinforcement section contacting the external electrode may be in the range of 1042 to 1120 μm when the number of layers of the stacked sheets are equal to or more than 50.

In the case where the thickness of the internal electrode is in the range of 2150 to 2499 μm and the extension length of the plating solution permeation preventing section is in the range of 290 to 550 μm, the thickness of the contact portion of the contact reinforcement section contacting the external electrode may be in the range of 1500 to 1750 μm when the number of layers of the stacked sheets are less than 50 and the thickness of the contact portion of the contact reinforcement section contacting the external electrode may be in the range of 1400 to 1620 μm when the number of layers of the stacked sheets are equal to or more than 50.

In the case where the thickness of the internal electrode is in the range of 2501 to 2750 μm and the extension length of the plating solution permeation preventing section is in the range of 290 to 550 μm, the thickness of the contact portion of the contact reinforcement section contacting the external electrode may be in the range of 1750 to 1920 μm when the number of layers of the stacked sheets are less than 50 and the thickness of the contact portion of the contact reinforcement section contacting the external electrode may be in the range of 1500 to 1650 μl when the number of layers of the stacked sheets are equal to or more than 50.

The stacked chip device may further include an emulsion block formed in the connection electrode.

The emulsion block may be formed by not applying the conductive material to the sheet by an opening hole having a shape corresponding the emulsion block, which is formed in a mask for forming the connection electrode at the time of forming the connection electrode.

The stacked chip device may include a multi-layer ceramic capacitor (MLCC).

According to another exemplary embodiment of the present invention, there is provided a manufacturing method of a stacked chip device including: forming an internal electrode on a sheet; forming a connection electrode extending from the internal electrode and constituted by a plating solution permeation preventing section and a contact reinforcement section; forming a stacked body by stacking the plurality of sheets including the internal electrode and the connection electrode; and forming external electrodes at both sides of the stacked body.

The plating solution permeation preventing section may extend with a thickness smaller than the thickness of the internal electrode and the contact reinforcement section may extend from the plating solution permeation preventing section, however, extending in the form in which the thickness thereof is gradually extended toward the external electrode.

The sheet may have rounded edges, and the contact reinforcement section may extend from a point spaced apart from the center of the rounded edge of the sheet by the shortest distance in the connection electrode.

The plating solution permeation preventing section may extend with the same thickness.

The thickness of the plating solution permeation preventing section may be 20 to 60% smaller than the thickness of the internal electrode and the thickness of the contact portion of the contact reinforcement section contacting the external electrode may be substantially 60 to 85% smaller than the thickness of the internal electrode.

DESCRIPTION OF THE PREFERRED EMBODIMENTS

Figure 1:
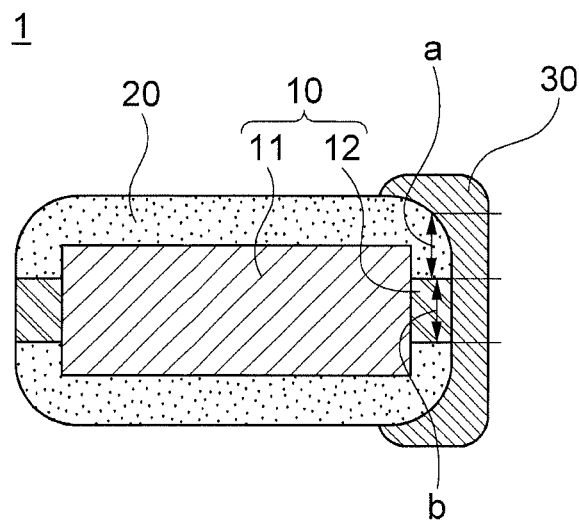
FIG. 1 is a cross-sectional view schematically showing a part of a stacked chip device in the related art.

Exemplary embodiments of the present invention for accomplishing the above-mentioned objects will be described with reference to the accompanying drawings. In describing exemplary embodiments of the present invention, the same reference numerals will be used to describe the same components and an additional description that is overlapped or allow the meaning of the present invention to be restrictively interpreted will be omitted.

A stacked chip device and a manufacturing method thereof according to exemplary embodiments of the present invention will now be described in more detail with reference to FIGS. 1 to 3.

Figure 2:
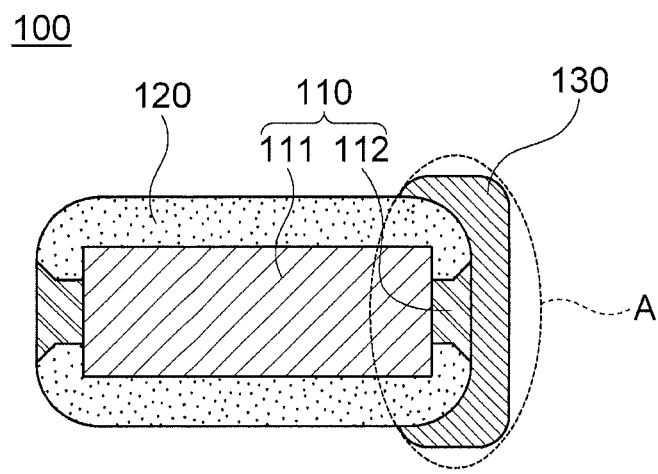
FIG. 2 is a cross-sectional view schematically showing a part of a stacked chip device according to an exemplary embodiment of the present invention.
Figure 3:
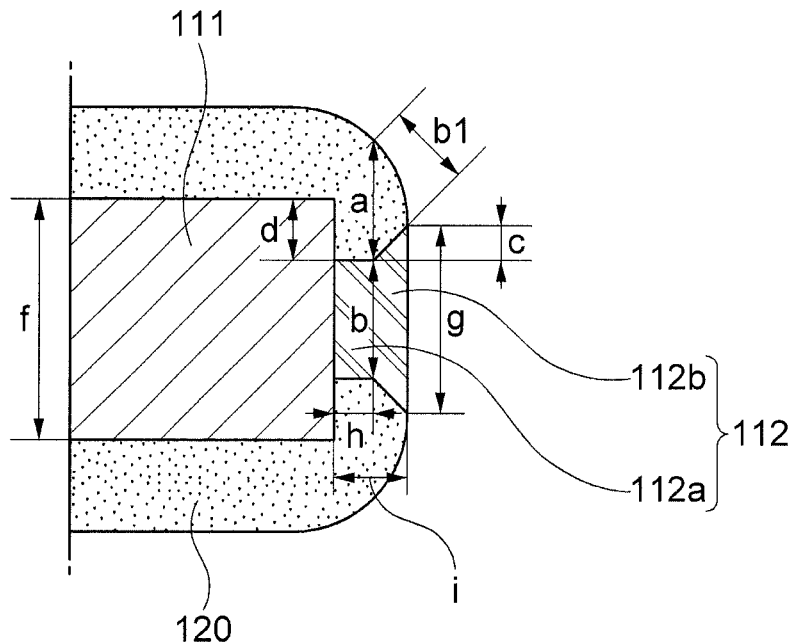
FIG. 3 is an enlarged diagram schematically showing part A of FIG. 2.
Figure 4:
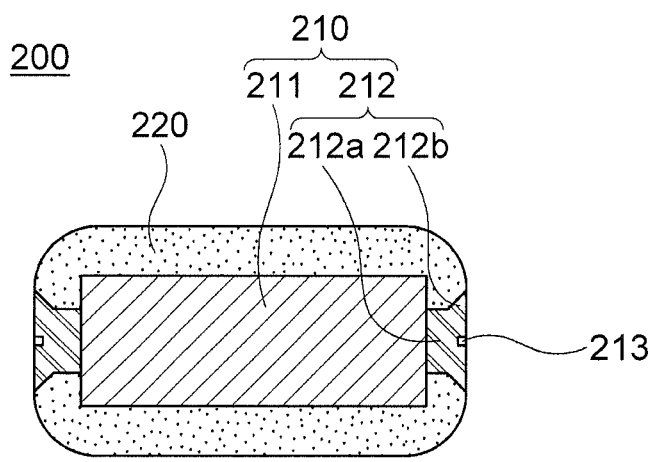
FIG. 4 is a cross-sectional view schematically showing a part of a stacked chip device according to another exemplary embodiment of the present invention.

FIG. 2 is a cross-sectional view schematically showing a part of a stacked chip device according to an exemplary embodiment of the present invention, FIG. 3 is an enlarged diagram schematically showing part A of FIG. 2, and FIG. 4 is a cross-sectional view schematically showing a part of a stacked chip device according to another exemplary embodiment of the present invention.

First, referring to FIGS. 2 and 3, a stacked chip device 100 according to an exemplary embodiment of the present invention may include a stacked body in which a plurality of sheets 120 having an internal electrode 111 made of a conductive material are stacked, external electrodes 130 are provided at both sides of the stacked body, and connection electrodes 112 extending from the internal electrode 111 and electrically connecting the internal electrode 111 with the external electrodes 130.

Herein, in the stacked chip device 100 according to the exemplary embodiment of the present invention, the connection electrode 112 may include a plating solution permeation preventing section 112a and a contact reinforcement section 112b.

In this case, the plating solution permeation preventing section 112a extends from the internal electrode 111, however, may extend with a thickness b smaller than the thickness f of the internal electrode 111 and extend with the same thickness as the internal electrode 111.

In addition, the contact reinforcement section 112b extends from the plating solution permeation preventing section 112a, however, may extend in the form in which the thickness thereof is gradually extended toward the external electrode 130.

Meanwhile, the sheet 120 may be formed by a dielectric green sheet in which edges are rounded, and as a result, the contact reinforcement section 112b may extend from a point which is substantially spaced apart from the center of the edge of the sheet 120 by the shortest distance a in the connection electrode 112.

Since a plating solution is permeated primarily from the center of the edge of the stacked body, that is, the sheet 120 while the external electrodes 130 at both sides of the stacked body are plated by dipping, the plating solution permeation preventing section 112a may extend at least up to the point which is spaced apart from the center of the edge of the sheet 120 by the shortest distance a, and as a result, the contact reinforcement section 112b may extend in the form of the thickness thereof is gradually extended toward the external electrode 130 from the point.

In this case, the contact reinforcement section 112b has the form in which the thickness thereof is gradually extended toward the external electrode 130, however, when the thickness is rapidly extended and thus the thickness is extended by substantially a half c of a difference between a thickness g of a portion of the contact reinforcement section 112b contacting the external electrode 130 and the thickness b of the plating solution permeation preventing section 112a, a distance b1 from the center of the edge of the sheet 120 is shortened, such that a plating solution permeation possibility increases, and as a result, a design through consideration thereof is preferable.

Preferably, the thickness b of the plating solution permeation preventing section 112a may be 20 to 60% smaller than the thickness f of the internal electrode 111 and the thickness g of the contact portion of the contact reinforcement section 112b contacting the external electrode 130 may be substantially 60 to 85% smaller than the thickness f of the internal electrode.

In addition, an extension length h of the plating solution permeation preventing section 112a for each entire extension length i of the connection electrode 112, that is, a start point of the contact reinforcement section 112b may relatively have an optimal ratio shown in Table 1.

TABLE 1

| Entire extension length I of connection electrode 112 | Extension length h of plating solution permeation preventing section 112a |
|---|---|
| 120~260 μm | 110~250 μm |
| 130~500 μm | 120~480 μm |
| 190~1178 μm | 180~1030 μm |
| 220~1490 μm | 210~1220 μm |
| 150~1600 μm | 140~1080 μm |
| 330~700 μm | 290~550 μm |

Further, an optimal ratio (g/F) of the thickness g of the contact portion of the contact reinforcement section 112b to the thickness f of the internal electrode 111, an optimal ratio (h/f) of the extension length h of the plating solution permeation preventing section 112a to the thickness f of the internal electrode 111, and experimental results of a percentage by capacity and a contact occurrence frequency in this case are shown in Table 2.

TABLE 2

| f | h/f | Number of layers of stacked sheets | g/f | Percentage by capacity | Contact occurrence frequency |
|---|---|---|---|---|---|
| 500 μm | 24% or more | 200 | 74% | 99.3% | 514 PPM |
| | | | 80% | 99.5% | 31 PPM |
| | | | 85% | 99.8% | 15 PPM |

TABLE 2-continued

| f | h/f | Number of layers of stacked sheets | g/f | Percentage by capacity | Contact occurrence frequency |
|---|---|---|---|---|---|
| 800 μm | 20% or more | 250 | 90% | 99.9% | 12 PPM |
| | | | 70% | 99.5% | 217 PPM |
| | | | 85% | 101.3% | 8 PPM |
| 1200 μm | 13% or more | 300 | 63% | 99.6% | 81 PPM |
| | | | 85% | 99.4% | 6 PPM |
| 1600 μm | 10% or more | 350 | 60% | 99.8% | 52 PPM |
| | | | 85% | 99.9% | 5 PPM |

According to the result of the performed experiment, when the thickness f of the internal electrode 111 is small, the percentage of capacity is also slightly increased while the thickness g of the contact portion of the contact reinforcement section 112b increases and the contact occurrence frequency is rapidly decreased when the optimal ratio (g/f) of the thickness g of the contact portion of the contact reinforcement section 112b to the thickness f of the internal electrode 111 is 85%.

Further, even when the thickness f of the internal electrode 111 has another value, the same result is acquired as a comparison with the case where the optimal ratio (g/f) of the thickness g of the contact portion of the contact reinforcement section 112b to the thickness f of the internal electrode 111 is 85%. Consequently, when the optimal ratio (g/f) of the thickness g of the contact portion of the contact reinforcement section 112b to the thickness f of the internal electrode 111 is accepted as 85% regardless of the thickness f of the internal electrode 111, a contact failure can be solved. However, a crack of the internal electrode caused by permeation of the plating solution may be reduced as the optimal ratio (g/f) of the thickness g of the contact portion of the contact reinforcement section 112b to the thickness f of the internal electrode 111 is preferably lower.

Additionally, when the number of stacked sheets 120 decreases, a contact area between the external electrode 130 and the connection electrode 112 decreases, such that the optimal ratio (g/f) of the thickness g of the contact portion of the contact reinforcement section 112b to the thickness f of the internal electrode 111 may vary depending on the number of stacked sheets. Therefore, it is checked how the contact occurrence frequency varies by changing the number of stacked sheets.

In this case, the experiment is performed under the same material and the same process for each of the size of the multi-layer ceramic capacitor, that is, the thickness f of the internal electrode 111 and when polishing after firing is not applied, a contact influence becomes larger due to noise of a surface oxidation layer Therefore, each difference is checked by performing the polishing and scanning probe lithography (SPL). Thereafter, electrode application and plating for forming the external electrodes are performed and selection is performed using a measurement selector for each condition, and thereafter, a capacity zero failure is separately measured to an occurrence frequency of the failure due to contact is checked. However, since an absolution contact area varies depending on the thickness of the internal electrode, external electrode paste having a sintering temperature suitable therefor is used.

As a result of the performed experiment, an optimal specification for the thickness g of the contact portion of the contact reinforcement section 112b for each number of layers depending on the thickness f of the internal electrode 111 and the optimal ratio of the thickness g of the contact portion to the thickness f of the internal electrode 111 are shown in Table 3.

TABLE 3

| Extension length h of plating solution permeation preventing section | Thickness f of internal electrode | Number of layers of stacked sheets | g/f | g |
|---|---|---|---|---|
| 110~250 μm | 250~340 μm | 40 or less | 85% | 210~290 μm |
| | | 40 or more | 80% | 200~270 μm |
| 120~480 μm | 250~840 μm | 40 or less | 85% | 210~710 μm |
| | | 40 or more | 80% | 200~670 μm |
| 180~1030 μm | 285~799 μm | 40 or less | 85% | 240~680 μm |
| | | 40 or more | 80% | 230~640 μm |
| | 800~1740 μm | 50 or less | 85% | 680~1480 μm |
| | | 50 or more | 75% | 600~1300 μm |
| 210~1220 μm | 1119~1740 μm | 50 or less | 85% | 950~1480 μm |
| | | 50 or more | 75% | 840~1300 μm |
| | 1200~1980 μm | 50 or less | 75% | 900~1480 μm |
| | | 50 or more | 70% | 840~1380 μm |
| 140~1080 μm | 1200~1599 μm | 50 or less | 75% | 900~1200 μm |
| | | 50 or more | 70% | 840~1120 μm |
| | 1600~1730 μm | 50 or less | 70% | 1120~1200 μm |
| | | 50 or more | 65% | 1040~1120 μm |
| 290~550 μm | 2150~2499 μm | 50 or less | 70% | 1520~1750 μm |
| | | 50 or more | 65% | 1400~1620 μm |
| | 2501~2750 μm | 50 or less | 70% | 1750~1920 μm |
| | | 50 or more | 60% | 1500~1650 μm |

When the thickness g of the contact portion of the contact reinforcement section 112b is designed by the optimal ratio, a stacked ceramic capacity having excellent production yield and reliability can be manufactured by improving the contact efficiency with the external electrode while maintaining a margin of the contact portion for preventing permeation of the plating solution.

Meanwhile, as shown in FIG. 4, in the stacked chip device according to the exemplary embodiment of the present invention, a connection electrode 212 may further include an emulsion block 213.

Herein, the emulsion block 213 may be formed by not applying paste made of the conductive material to a dielectric sheet 220 by an opening hole having a shape corresponding the emulsion block, which is formed in a mask for forming the connection electrode at the time of forming the connection electrode 212.

In the stacked chip device according to the exemplary embodiment of the present invention, by forming the emulsion block in the connection electrode 212, that is, a contact reinforcement section 212b, when the conductive paste is applied through printing by using the mask and the mask is removed in order to form the connection electrode 212, the opening hole corresponding to the emulsion block 213 automatically lifts up the conductive paste to increase the height of the contact reinforcement section 212b, and a result, electrical connectivity can be improved by preventing a saddle phenomenon in which the connection of the electrode is cut off after sintering.

As set forth above, according to the stacked chip device and the manufacturing method thereof the exemplary embodiments of the present invention, it is possible to prevent the plating solution from permeating the internal electrode from the outside.

In addition, according to the stacked chip device and the manufacturing method thereof the exemplary embodiments of the present invention, it is possible to minimize cracking that occurs due to thermal shock, while manufacturing or mounting.

Further, according to the stacked chip device and the manufacturing method thereof the exemplary embodiments of the present invention, it is possible to improve the performance and reliability of a product by preventing a capacity from being deteriorated through improving connection efficiency between the internal electrode and the external electrode.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims. Accordingly, such modifications, additions and substitutions should also be understood to fall within the scope of the present invention.

What is claimed is:

1. A stacked chip device, comprising:
a stacked body in which a plurality of sheets having an internal electrode made of a conductive material are stacked;
external electrodes provided at both sides of the stacked body; and
connection electrodes extending from the internal electrode and electrically connecting the internal electrode with the external electrodes,
wherein the connection electrodes include:
a plating solution permeation preventing section extending from the internal electrode, however, extending with a thickness smaller than the thickness of the internal electrode; and
a contact reinforcement section extending from the plating solution permeation preventing section, however, extending in the form in which the thickness thereof is gradually extended toward the external electrode.

2. The stacked chip device according to claim 1, wherein:
the sheet is formed by a green sheet having rounded edges, and
the contact reinforcement section extends from a point spaced apart from the center of the edge of the sheet by the shortest distance in the connection electrode.

3. The stacked chip device according to claim 1, wherein the plating solution permeation preventing section extends with the same thickness.

4. The stacked chip device according to claim 1, wherein the thickness of the plating solution permeation preventing section is 20 to 60% smaller than the thickness of the internal electrode and the thickness of the contact portion of the contact reinforcement section contacting the external electrode is substantially 60 to 85% smaller than the thickness of the internal electrode.

5. The stacked chip device according to claim 4, wherein in the case where the thickness of the internal electrode is in the range of 250 to 340 μm and an extension length of the plating solution permeation preventing section is in the range of 110 to 250 μm, the thickness of the contact portion of the contact reinforcement section contacting the external electrode is in the range of 210 to 290 μm when the number of layers of the stacked sheets are less than 40 and the thickness of the contact portion of the contact reinforcement section contacting the external electrode is in the range of 200 to 270 μm when the number of layers of the stacked sheets are equal to or more than 40.

6. The stacked chip device according to claim 4, wherein in the case where the thickness of the internal electrode is in the range of 250 to 840 μm and the extension length of the plating solution permeation preventing section is in the range of 120 to 480 μm, the thickness of the contact portion of the contact reinforcement section contacting the external electrode is in the range of 210 to 710 μm when the number of layers of the stacked sheets are less than 40 and the thickness of the contact portion of the contact reinforcement section contacting the external electrode is in the range of 200 to 670 μm when the number of layers of the stacked sheets are equal to or more than 40.

7. The stacked chip device according to claim 4, wherein in the case where the thickness of the internal electrode is in the range of 285 to 799 μm and the extension length of the plating solution permeation preventing section is in the range of 180 to 1030 μm, the thickness of the contact portion of the contact reinforcement section contacting the external electrode is in the range of 240 to 680 μm when the number of layers of the stacked sheets are less than 40 and the thickness of the contact portion of the contact reinforcement section contacting the external electrode is in the range of 230 to 640 μm when the number of layers of the stacked sheets are equal to or more than 40.

8. The stacked chip device according to claim 4, wherein in the case where the thickness of the internal electrode is in the range of 800 to 1740 μm and the extension length of the plating solution permeation preventing section is in the range of 180 to 1030 μm, the thickness of the contact portion of the contact reinforcement section contacting the external electrode is in the range of 680 to 1480 μm when the number of layers of the stacked sheets are less than 50 and the thickness of the contact portion of the contact reinforcement section contacting the external electrode is in the range of 600 to 1300 μm when the number of layers of the stacked sheets are equal to or more than 50.

9. The stacked chip device according to claim 4, wherein in the case where the thickness of the internal electrode is in the range of 1119 to 1740 μm and the extension length of the plating solution permeation preventing section is in the range of 210 to 1220 μm, the thickness of the contact portion of the contact reinforcement section contacting the external electrode is in the range of 950 to 1480 μm when the number of layers of the stacked sheets are less than 50 and the thickness of the contact portion of the contact reinforcement section contacting the external electrode is in the range of 840 to 1300 μm when the number of layers of the stacked sheets are equal to or more than 50.

10. The stacked chip device according to claim 4, wherein in the case where the thickness of the internal electrode is in the range of 1200 to 1980 μm and the extension length of the plating solution permeation preventing section is in the range of 210 to 1220 μm, the thickness of the contact portion of the contact reinforcement section contacting the external electrode is in the range of 900 to 1480 μm when the number of layers of the stacked sheets are less than 50 and the thickness of the contact portion of the contact reinforcement section contacting the external electrode is in the range of 840 to 1380 μm when the number of layers of the stacked sheets are equal to or more than 50.

11. The stacked chip device according to claim 4, wherein in the case where the thickness of the internal electrode is in the range of 1200 to 1599 μm and the extension length of the plating solution permeation preventing section is in the range of 140 to 1080 μm, the thickness of the contact portion of the contact reinforcement section contacting the external electrode is in the range of 900 to 1200 μm when the number of layers of the stacked sheets are less than 50 and the thickness of the contact portion of the contact reinforcement section contacting the external electrode is in the range of 840 to 1120 μm when the number of layers of the stacked sheets are equal to or more than 50.

12. The stacked chip device according to claim 4, wherein in the case where the thickness of the internal electrode is in the range of 1600 to 1730 μm and the extension length of the plating solution permeation preventing section is in the range of 140 to 1080 μm, the thickness of the contact portion of the contact reinforcement section contacting the external electrode is in the range of 1120 to 1200 μm when the number of layers of the stacked sheets are less than 50 and the thickness of the contact portion of the contact reinforcement section contacting the external electrode is in the range of 1042 to 1120 μm when the number of layers of the stacked sheets are equal to or more than 50.

13. The stacked chip device according to claim 4, wherein in the case where the thickness of the internal electrode is in the range of 2150 to 2499 μm and the extension length of the plating solution permeation preventing section is in the range of 290 to 550 μm, the thickness of the contact portion of the contact reinforcement section contacting the external electrode is in the range of 1500 to 1750 μm when the number of layers of the stacked sheets are less than 50 and the thickness of the contact portion of the contact reinforcement section contacting the external electrode is in the range of 1400 to 1620 μm when the number of layers of the stacked sheets are equal to or more than 50.

14. The stacked chip device according to claim 4, wherein in the case where the thickness of the internal electrode is in the range of 2501 to 2750 μm and the extension length of the plating solution permeation preventing section is in the range of 290 to 550 μm, the thickness of the contact portion of the contact reinforcement section contacting the external electrode is in the range of 1750 to 1920 μm when the number of layers of the stacked sheets are less than 50 and the thickness of the contact portion of the contact reinforcement section contacting the external electrode is in the range of 1500 to 1650 μm when the number of layers of the stacked sheets are equal to or more than 50.

15. The stacked chip device according to claim 1, further comprising an emulsion block formed in the connection electrode.

16. The stacked chip device according to claim 15, wherein the emulsion block is formed by not applying the conductive material to the sheet by an opening hole having a shape corresponding the emulsion block, which is formed in a mask for forming the connection electrode at the time of forming the connection electrode.

17. The stacked chip device according to claim 1, wherein the stacked chip device includes a multi-layer ceramic capacitor (MLCC).

18. A manufacturing method of a stacked chip device, comprising:
 forming an internal electrode on a sheet;
 forming a connection electrode extending from the internal electrode and constituted by a plating solution permeation preventing section and a contact reinforcement section;
 forming a stacked body by stacking the plurality of sheets including the internal electrode and the connection electrode; and
 forming external electrodes at both sides of the stacked body.

19. The manufacturing method of a stacked chip device according to claim 18, wherein the plating solution permeation preventing section extends with a thickness smaller than the thickness of the internal electrode and the contact reinforcement section extends from the plating solution permeation preventing section, however, extending in the form in which the thickness thereof is gradually extended toward the external electrode.

20. The manufacturing method of a stacked chip device according to claim 18, wherein:
 the sheet has rounded edges, and
 the contact reinforcement section extends from a point spaced apart from the center of the rounded edge of the sheet by the shortest distance in the connection electrode.

21. The manufacturing method of a stacked chip device according to claim 18, wherein the plating solution permeation preventing section extends with the same thickness.

22. The manufacturing method of a stacked chip device according to claim 18, wherein the thickness of the plating solution permeation preventing section is 20 to 60% smaller than the thickness of the internal electrode and the thickness of the contact portion of the contact reinforcement section contacting the external electrode is substantially 60 to 85% smaller than the thickness of the internal electrode.

\* \* \* \* \*

UNITED STATES PATENT AND TRADEMARK OFFICE
CERTIFICATE OF CORRECTION

PATENT NO.       : 8,675,342 B2  
APPLICATION NO.  : 13/494544  
DATED            : March 18, 2014  
INVENTOR(S)      : Shin et al.

Page 1 of 1

It is certified that error appears in the above-identified patent and that said Letters Patent is hereby corrected as shown below:

In the Specification

Column 1, Line 8, delete "10-20402011-" and insert -- 10-2011- --, therefor

Signed and Sealed this
First Day of July, 2014

Michelle K. Lee
*Deputy Director of the United States Patent and Trademark Office*